United States Patent
Ogura et al.

(10) Patent No.: US 11,917,696 B2
(45) Date of Patent: Feb. 27, 2024

(54) CONTROL DEVICE, CONTROL METHOD, NON-TRANSITORY COMPUTER-READABLE MEDIUM, AND COMMUNICATION SYSTEM

(71) Applicant: NEC Corporation, Tokyo (JP)

(72) Inventors: Masato Ogura, Tokyo (JP); Minoru Hattori, Tokyo (JP)

(73) Assignee: NEC CORPORATION, Tokyo (JP)

( * ) Notice: Subject to any disclaimer, the term of this patent is extended or adjusted under 35 U.S.C. 154(b) by 372 days.

(21) Appl. No.: 17/434,810

(22) PCT Filed: Jan. 9, 2020

(86) PCT No.: PCT/JP2020/000515
§ 371 (c)(1),
(2) Date: Aug. 30, 2021

(87) PCT Pub. No.: WO2020/179214
PCT Pub. Date: Sep. 10, 2020

(65) Prior Publication Data
US 2022/0104283 A1    Mar. 31, 2022

(30) Foreign Application Priority Data

Mar. 1, 2019 (JP) ................................. 2019-037338

(51) Int. Cl.
*H04W 74/08* (2009.01)
*H04W 56/00* (2009.01)
*H04W 72/29* (2023.01)

(52) U.S. Cl.
CPC ..... *H04W 74/0858* (2013.01); *H04W 56/001* (2013.01); *H04W 72/29* (2023.01)

(58) Field of Classification Search
CPC .......... H04W 74/0858; H04W 56/001; H04W 72/29; H04W 56/00; H04W 74/0891; Y02D 30/70

(Continued)

(56) References Cited

U.S. PATENT DOCUMENTS 5,485,003 A * 1/1996 Kusada ................ G02B 7/346
250/201.8
6,788,702 B1 * 9/2004 Garcia-Luna-Aceves ..................
H04L 45/44
370/337

(Continued)

FOREIGN PATENT DOCUMENTS

CA    2746661 A1 * 6/2010 ............. H03M 7/30
CA    2816758 A1 * 5/2012 ........ H04W 52/0216

(Continued)

OTHER PUBLICATIONS

International Search Report for PCT Application No. PCT/JP2020/000515, dated Mar. 3, 2020.

(Continued)

*Primary Examiner* — Mahendra R Patel
(74) *Attorney, Agent, or Firm* — Sughrue Mion, PLLC

(57) ABSTRACT

In a control device (10), a determination unit (11) determines "a plurality of collision-occurrence-estimated devices" for which "transmission collision" is estimated to occur due to overlapping of transmission schedule timings among the plurality of communication devices. A transmission control unit (12) executes transmission control of transmitting, to each of some of the plurality of collision-occurrence-estimated devices, each of a plurality of "timing distribution control signals" for distributing transmission timings of the plurality of collision-occurrence-estimated devices determined by the determination unit (11).

10 Claims, 9 Drawing Sheets

(58) Field of Classification Search
USPC .......................................................... 370/329

See application file for complete search history.

(56) References Cited

U.S. PATENT DOCUMENTS

| | | | | |
|---|---|---|---|---|
| 6,791,997 | B2* | 9/2004 | Beyer | H04W 40/24 |
| | | | | 370/461 |
| 9,210,597 | B2* | 12/2015 | Radulescu | H04W 74/002 |
| 9,379,858 | B2* | 6/2016 | Erceg | H04L 27/2602 |
| 10,218,476 | B2* | 2/2019 | Lunttila | H04L 5/001 |
| 10,862,997 | B2* | 12/2020 | Chin | H04L 67/10 |
| 2005/0070293 | A1* | 3/2005 | Tsukiji | H04W 48/20 |
| | | | | 455/436 |
| 2009/0040985 | A1* | 2/2009 | Barnawi | H04L 45/00 |
| | | | | 370/336 |
| 2009/0052429 | A1* | 2/2009 | Pratt, Jr. | H04W 56/002 |
| | | | | 370/350 |
| 2011/0007710 | A1* | 1/2011 | Makita | H04W 36/0058 |
| | | | | 370/331 |
| 2016/0021006 | A1* | 1/2016 | Vasseur | H04L 45/04 |
| | | | | 370/235 |
| 2018/0302911 | A1* | 10/2018 | Aijaz | H04L 12/189 |
| 2019/0089439 | A1* | 3/2019 | Shimomura | H04B 17/336 |
| 2019/0181910 | A1* | 6/2019 | Goto | H04W 52/50 |
| 2019/0281527 | A1* | 9/2019 | Kuwahara | H04W 40/16 |

FOREIGN PATENT DOCUMENTS

| | | | | |
|---|---|---|---|---|
| CA | 3076387 | A1 * | 9/2018 | ......... H04B 7/18513 |
| CN | 107214680 | A * | 9/2017 | ............. B25J 19/00 |
| JP | 2007-129570 | A | 5/2007 | |
| JP | 2018-182728 | A | 11/2018 | |
| JP | 2019-161265 | A | 9/2019 | |
| JP | 7075897 | B2 * | 5/2022 | ............. B41J 19/94 |
| WO | WO-03019798 | A2 * | 3/2003 | ............. H04W 45/20 |
| WO | WO-2012016187 | A2 * | 2/2012 | ............. H04K 3/222 |
| WO | WO-2019154518 | A1 * | 8/2019 | ............. H04B 1/715 |

OTHER PUBLICATIONS

LoRa Alliance Technical Committee, "LoRaWAN 1.1 Specification", Oct. 11, 2017, pp. 1-101.

Terada et al., "Proposal of collisionless multiple access protocols with LoRa", IEICE Technical Report, vol. 118, No. 393, Jan. 10, 2019, pp. 65-70.

* cited by examiner

CONTROL DEVICE, CONTROL METHOD, NON-TRANSITORY COMPUTER-READABLE MEDIUM, AND COMMUNICATION SYSTEM

This application is a National Stage Entry of PCT/JP2020/000515 filed on Jan. 9, 2020, which claims priority from Japanese Patent Application 2019-037338 filed on Mar. 1, 2019, the contents of all of which are incorporated herein by reference, in their entirety.

TECHNICAL FIELD

The present disclosure relates to a control device, a control method, a control program, and a communication system.

BACKGROUND ART

As a wireless communication technique for Internet of Things (IoT), a technique generically named as a low power wide area (LPWA) which can cover a wide area with low power consumption has been drawing attention.

Then, a communication system which achieves an LPWA has been suggested (e.g., Non Patent Literature 1). A communication system disclosed in Non Patent Literature 1 includes a network server, a gateway, and a communication device (end terminal).

In the communication system, a channel (frequency) and a data rate (diffusion rate) are allocated to the communication device, and the communication device transmits a data signal by use of the allocated channel and data rate. The communication system reduces a possibility of occurrence of transmission collision by allocating a combination of channels and data rates differing from one another to a plurality of communication devices, even when transmission timings of the plurality of communication devices overlap. A technique for automatically allocating the data rate is referred to as an adaptive data rate (ADR).

Moreover, the communication system prepares a technique referred to as "carrier sense" as a differing technique which reduces a possibility of occurrence of transmission collision. The carrier sense is a technique which confirms, before a communication device starts transmission, whether a channel to be used is used by another communication device.

CITATION LIST

Non Patent Literature

[Non Patent Literature 1] LoRaWAN (registered trademark) 1.1 Specification

SUMMARY OF INVENTION

Technical Problem

The present inventor has found out that there is a possibility that the number of communication devices whose transmission timings overlap becomes large when a large number of communication devices exist under a network server, and there is a possibility of not being able to sufficiently reduce a possibility of occurrence of transmission collision by the above-described ADR and carrier sense when the number of communication devices whose transmission timings overlap is large. Then, when a possibility of occurrence of transmission collision is high, there is a possibility that throughput of a communication system deteriorates.

An object of the present disclosure is to provide a control device, a control method, a control program, and a communication system which can reduce a loss of a packet resulting from prevention of congestion of a communication system.

Solution to Problem

A control device according to a first aspect is a control device which controls transmission timings of a plurality of communication devices existing under a network device and each transmitting a data signal toward the network device at a transmission period being associated with each of the communication devices, and the control device includes:
   a determination unit that determines a plurality of collision-occurrence-estimated devices for which transmission collision is estimated to occur due to overlapping of transmission schedule timings among the plurality of communication devices; and
   a transmission control unit that executes transmission control of transmitting, to each of some of the plurality of collision-occurrence-estimated devices, each of a plurality of timing distribution control signals for distributing transmission timings of the plurality of collision-occurrence-estimated devices.

A control method according to a second aspect is a control method of controlling transmission timings of a plurality of communication devices existing under a network device and each transmitting a data signal toward the network device at a transmission period being associated with each of the communication devices, and the control method includes:
   determining a plurality of collision-occurrence-estimated devices for which transmission collision is estimated to occur due to overlapping of transmission schedule timings among the plurality of communication devices; and
   executing transmission control of transmitting, to each of some of the plurality of collision-occurrence-estimated devices, each of a plurality of timing distribution control signals for distributing transmission timings of the plurality of collision-occurrence-estimated devices.

A control program according to a third aspect causes a control device which controls transmission timings of a plurality of communication devices existing under a network device and each transmitting a data signal toward the network device at a transmission period being associated with each of the communication devices, to execute processing of
   determining a plurality of collision-occurrence-estimated devices for which transmission collision is estimated to occur due to overlapping of transmission schedule timings among the plurality of communication devices, and
   executing transmission control of transmitting, to each of some of the plurality of collision-occurrence-estimated devices, each of a plurality of timing distribution control signals for distributing transmission timings of the plurality of collision-occurrence-estimated devices.

A communication system according to a fourth aspect includes:
   a plurality of communication devices existing under a network device and each transmitting a data signal toward the network device at a transmission period being associated with each of the communication devices; and the network device which controls transmission timings of the plurality of communication devices, wherein the network device includes a determination unit that determines a plurality of collision-occurrence-estimated devices for which transmission collision is estimated to occur due to overlapping of transmission schedule timings among the plurality of communication devices, and a transmission control unit that executes transmission control of transmitting, to each of some of the plurality of collision-occurrence-estimated devices, each of a plurality of timing distribution control signals for distributing transmission timings of the plurality of collision-occurrence-estimated devices.

Advantageous Effects of Invention

The present disclosure can provide a control device, a control method, a control program, and a communication system which can reduce a loss of a packet resulting from prevention of congestion of a communication system.

DESCRIPTION OF EMBODIMENTS

Hereinafter, example embodiments are described with reference to the drawings. Note that, in the example embodiments, the same reference sign is assigned to the same or equivalent element, and repeated description thereof is omitted.

First Example Embodiment

Figure 1:
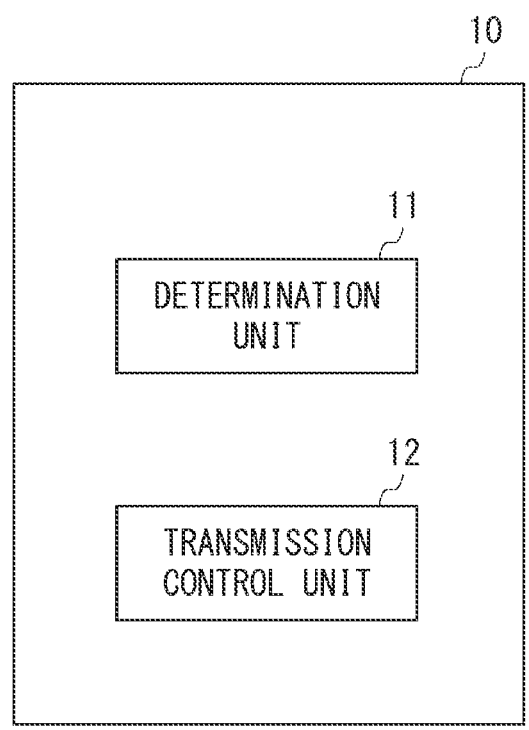
FIG. 1 is a block diagram illustrating one example of a control device according to a first example embodiment.

FIG. 1 is a block diagram illustrating one example of a control device according to a first example embodiment. A control device 10 illustrated in FIG. 1 is used, for example, by being included in a network device (not illustrated), or connected to a network device (not illustrated). The control device 10 is a device which controls transmission timings of a plurality of communication devices (not illustrated) existing under a network device (not illustrated) and each transmitting a data signal toward the network device (not illustrated) at a transmission period (a transmission cycle) being associated with each of the communication devices (not illustrated).

In FIG. 1, the control device 10 includes a determination unit 11 and a transmission control unit 12.

The determination unit 11 determines "a plurality of collision-occurrence-estimated devices" for which "transmission collision" is estimated to occur due to overlapping of transmission schedule timings among the plurality of communication devices (not illustrated).

The transmission control unit 12 executes transmission control of transmitting, to each of some of the plurality of collision-occurrence-estimated devices, each of a plurality of "timing distribution control signals" for distributing transmission timings of the plurality of collision-occurrence-estimated devices determined by the determination unit 11.

Since transmission timings of a plurality of collision-occurrence-estimated devices can be distributed by a configuration of the control device 10 described above, a possibility of occurrence of transmission collision can be sufficiently reduced. As a result, a loss of a packet resulting from prevention of congestion of a communication system can be reduced.

Second Example Embodiment

<Outline of Communication System>

Figure 2:
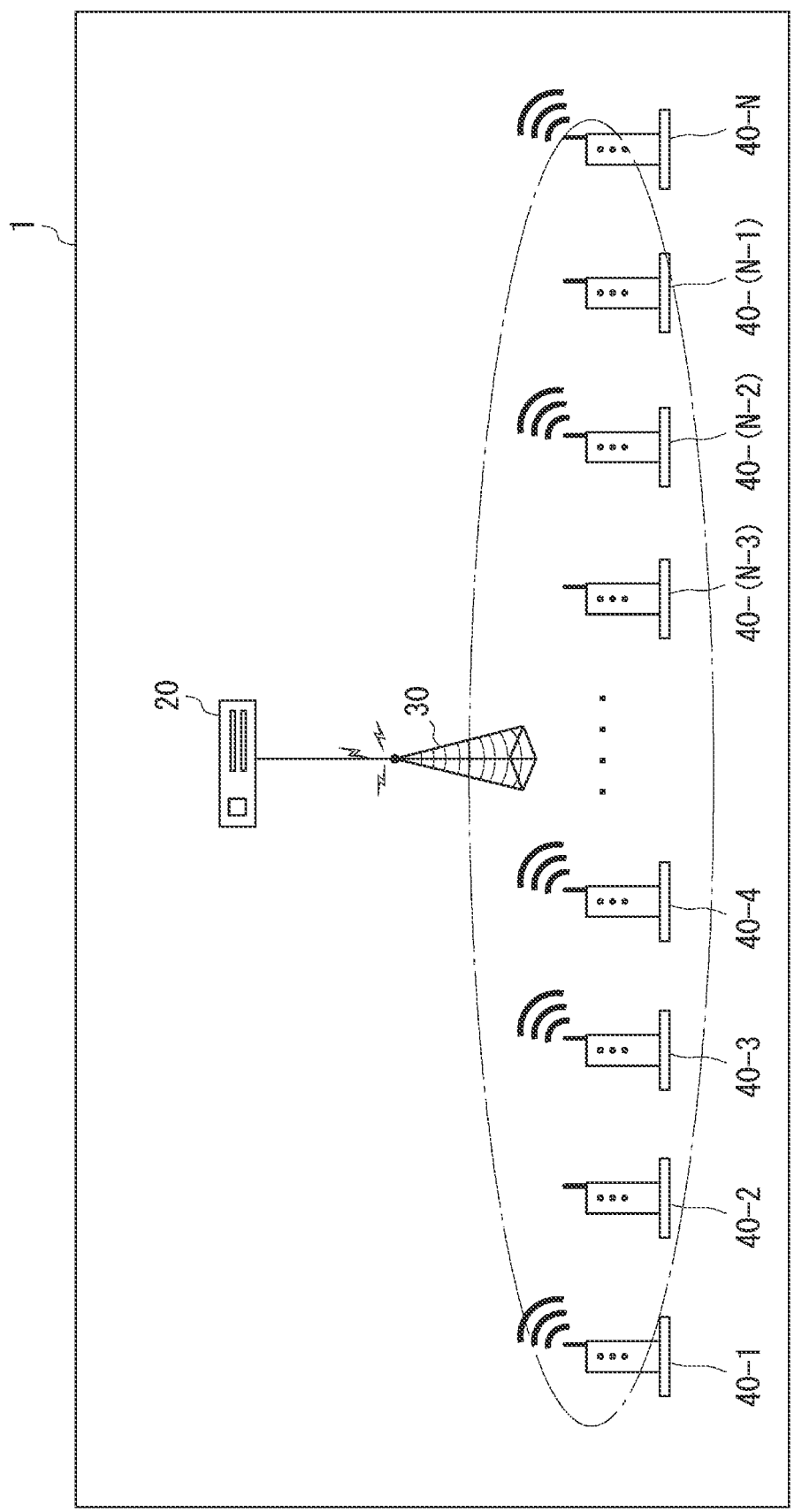
FIG. 2 is a diagram illustrating one example of a communication system according to a second example embodiment.

FIG. 2 is a diagram illustrating one example of a communication system according to a second example embodiment. In FIG. 2, a communication system 1 includes a network device 20, a relay device 30, and communication devices 40-1 to 40-N. Hereinafter, when the communication devices 40-1 to 40-N are not particularly distinguished, the communication devices 40-1 to 40-N may be generically named and briefly referred to as a communication device 40.

For example, the communication system 1 is a LoRaWAN (registered trademark) communication system, and the network device 20 is a LoRaWAN (registered trademark) network server. Moreover, for example, the relay device 30 is a LoRaWAN (registered trademark) gateway, and the communication device 40 is a LoRaWAN (registered trademark) device. Moreover, the communication system 1 is, for example, a system built in a plant, and the communication device 40 is, for example, a sensor device.

The communication devices 40-1 to 40-N include the communication device 40 being associated with the same transmission period as those of the other communication devices 40 among the communication devices 40-1 to 40-N, and the communication device 40 whose transmission period differs from that of any of the other communication devices 40 among the communication devices 40-1 to 40-N.

The communication device 40 transmits a data signal (e.g., a sensing result signal) to the relay device 30 (i.e., toward the network device 20) at a transmission timing based on a transmission period of the communication device 40 itself. Herein, as described above, when transmission timings overlap among the plurality of communication devices 40, there is a possibility that "transmission collision" occurs. For example, when the communication system 1 is a system built in a plant, there is a possibility that a sensing result signal transmitted from the communication device 40 does not reach the network device 20 due to transmission collision, discovery and solution of a problem are delayed accordingly, and a serious problem arises in a plant.

<Configuration Example of Control Device>

Figure 3:
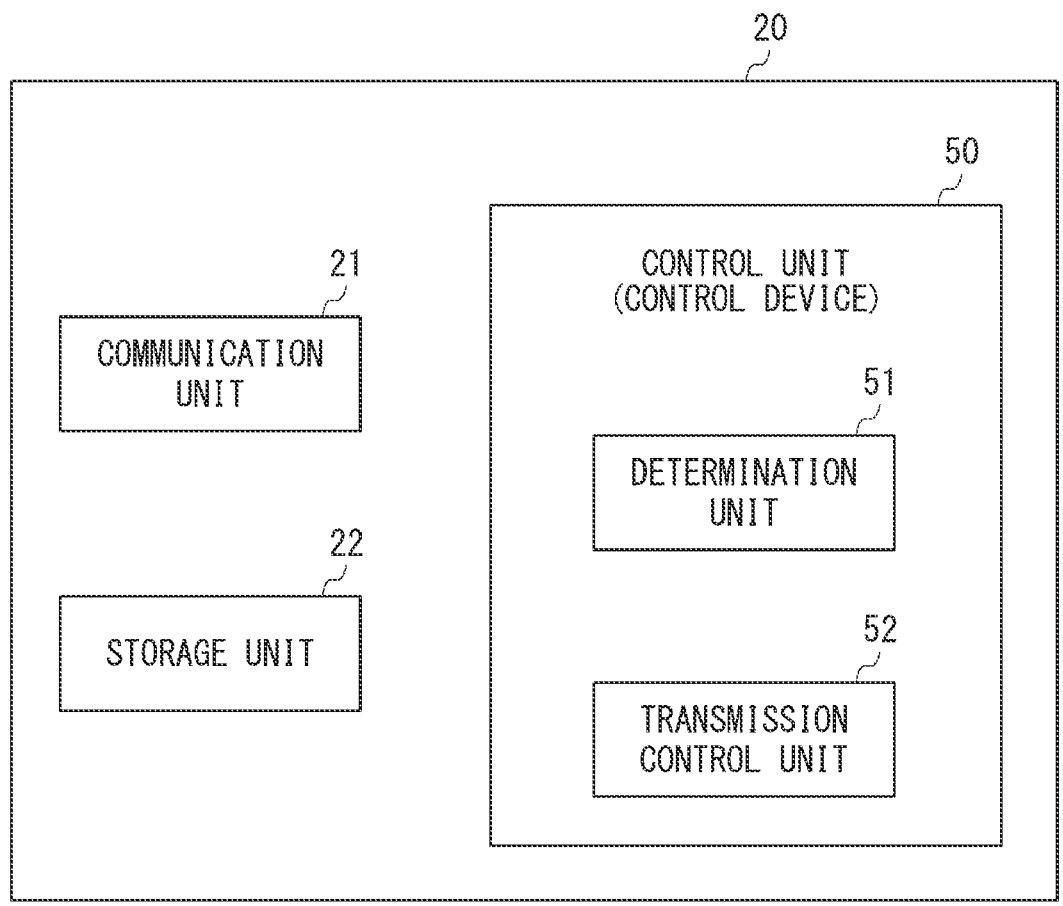
FIG. 3 is a block diagram illustrating one example of a network device including a control device according to the second example embodiment.

FIG. 3 is a block diagram illustrating one example of a network device including a control device according to the second example embodiment. In FIG. 3, the network device 20 includes a communication unit 21, a storage unit 22, and a control device 50. Note that, herein, description is given assuming that the control device 50 is included in the network device 20, but the present disclosure is not limited thereto, and the control device 50 may be a device being connected to the network device 20 and being separate from the network device 20.

The communication unit 21 is a function unit which performs communication with the relay device 30. The communication unit 21 receives, for example, a signal transmitted from the communication device 40 via the relay device 30. Moreover, the communication unit 21 transmits, for example, a signal received from the control device 50 to the relay device 30.

The storage unit 22 stores a communication history (i.e., a reception history of receiving, by the communication unit 21 via the relay device 30, a signal transmitted from the communication device 40) of each of the communication devices 40.

Moreover, in FIG. 3, the control device 50 includes a determination unit 51 and a transmission control unit 52.

The determination unit 51 determines a transmission period and a transmission schedule timing of each of the communication devices 40, for example, by use of a communication history stored in the storage unit 22. Then, the determination unit 51 determines, based on the determined transmission schedule timing of each of the communication devices 40, a plurality of collision-occurrence-estimated devices 40 for which transmission collision is estimated to occur due to overlapping of transmission timings among the communication devices 40-1 to 40-N. Herein, the plurality of collision-occurrence-estimated devices 40 to be determined may be limited to the plurality of communication devices 40 having the same previously allocated channel and data rate among the communication devices 40-1 to 40-N. In other words, the determination unit 51 may determine the plurality of collision-occurrence-estimated devices 40 which have the same previously allocated channel and data rate, and for which transmission collision is estimated to occur due to overlapping of transmission timings, among the communication devices 40-1 to 40-N.

Similarly to the transmission control unit 12 according to the first example embodiment, the transmission control unit 52 executes transmission control of transmitting, to each of some of a plurality of collision-occurrence-estimated devices, each of a plurality of "timing distribution control signals" for distributing transmission timings of the plurality of collision-occurrence-estimated devices determined by the determination unit 51.

For example, the transmission control unit 52 allocates a use data rate to each of a plurality of timing distribution control signals from a plurality of data rates whose diffusion rates differ from one another, in such a way that use data rates being associated with the plurality of timing distribution control signals are distributed. Then, the transmission control unit 52 executes transmission control of transmitting each of timing distribution control signals by use of a use data rate allocated to each of the timing distribution control signals. For example, the transmission control unit 52 causes the communication unit 21 to transmit, to the relay device 30, each of the timing distribution control signals, identification information of the communication device 40 being associated with each of the timing distribution control signals, and information indicating a use data rate allocated to each of the timing distribution control signals, in association with one another (all together). The relay device 30 receiving a signal transmitted from the communication unit 21 transmits, toward the communication device 40 being associated with each of the timing distribution control signals, each timing distribution control signal by a use data rate being associated with each of the timing distribution control signals. For example, the transmission control unit 52 may transmit each of the timing distribution control signals including identification information of the communication device 40 being associated with each of the timing distribution control signals, and information indicating a use data rate allocated to each of the timing distribution control signals. Herein, a time taken to receive a timing distribution control signal in the communication device 40 differs depending on a use data rate. In other words, a time taken to receive a timing distribution control signal transmitted by a low use data rate becomes longer than a time taken to receive a timing distribution control signal transmitted by a high use data rate. Thus, it takes a longer time for the communication device 40 which receives a timing distribution control signal transmitted by a lower use data rate to transmit a next data signal in response to reception of the timing distribution control signal. A possibility of occurrence of transmission collision with regard to the plurality of collision-occurrence-estimated devices 40 can be reduced by utilizing a lag of transmission timings resulting from a difference of the use data rates.

The above-described "timing distribution control signal" may be, for example, a "reconnection instruction signal" requesting the collision-occurrence-estimated device 40 receiving the timing distribution control signal to reconnect to the network device 20. When the communication system 1 is a LoRaWAN (registered trademark) communication system, a force rejoin command may be used as the "reconnection instruction signal".

Alternatively, the above-described "timing distribution control signal" may be, for example, a "transmission timing specification signal" which specifies, for the collision-occurrence-estimated device 40 receiving the timing distribution control signal, a transmission timing of a data signal scheduled to be transmitted next, to a timing after a predetermined time from a timing of receiving the timing distribution control signal. When the communication system 1 is a LoRaWAN (registered trademark) communication system, a "transmission timing specification signal" may be an application command. Herein, two methods can be conceived as a method of transmission control for a "transmission timing specification signal". The first method is a method in which the transmission control unit 52 transmits a transmission timing specification signal after transmitting a clock synchronization signal and then establishing clock synchronization between the network device 20 and the collision-occurrence-estimated device 40. The second method is a method which transmits a transmission timing specification signal without establishing clock synchronization.

Moreover, the transmission control unit 52 may execute transmission control of transmitting a timing distribution control signal, with, as a trigger, reception of a signal transmitted from the collision-occurrence-estimated device 40, before an occurrence timing at which transmission collision is estimated to occur. LoRaWAN (registered trademark) defines that a communication device needs to open two short reception windows (RX1 and RX2). A start timing of a reception window is defined with an end of data transmission of a communication device as a base. Thus, when the communication system 1 is a LoRaWAN (registered trademark) communication system, the transmission control unit 52 controls in such a way that a timing distribution control signal is transmitted from the relay device 30 at a timing of each of two reception windows (RX1 and RX2).

Note that, when the communication system 1 is a LoRaWAN (registered trademark) communication system, the transmission control unit 52 may execute an ADR regarding a plurality of collision-occurrence-estimated devices and perform a channel change or a data rate change, before transmission control of transmitting each of a plurality of "timing distribution control signals" to each of some of a plurality of collision-occurrence-estimated devices. Then, when it is determined, even by execution of the ADR, that transmission collision occurs, the transmission control unit 52 may execute transmission control of transmitting each of a plurality of "timing distribution control signals" to each of some of a plurality of collision-occurrence-estimated devices.

Moreover, adjustment of a transmission timing by a "transmission timing specification signal" may be performed when it is determined, even by performing adjustment of a transmission timing by a "reconnection instruction signal", that transmission collision occurs.

<Operation Example of Control Device>

Figure 4:
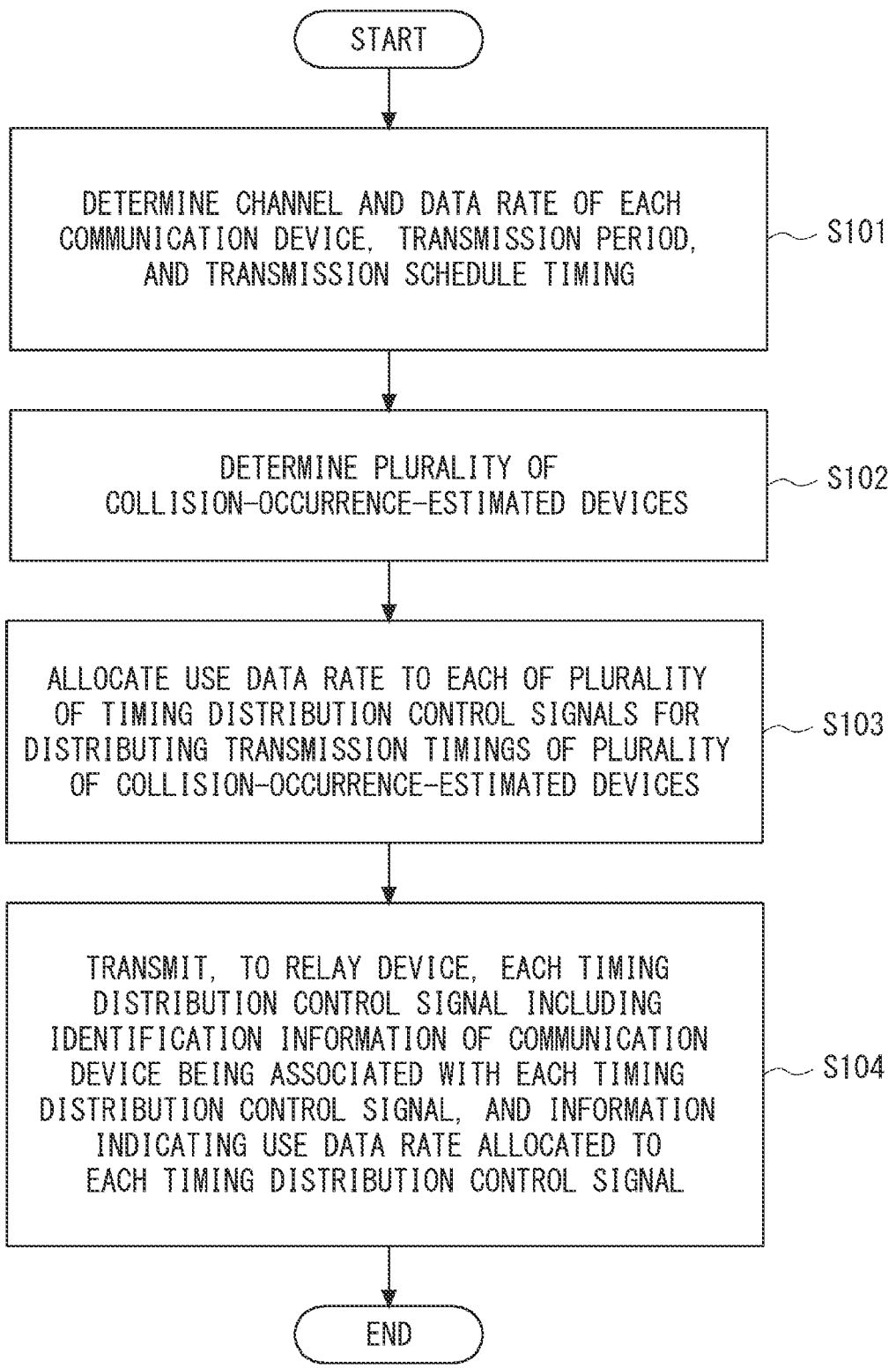
FIG. 4 is a flowchart illustrating one example of a processing operation of the control device according to the second example embodiment.

One example of a processing operation of the control device having the above configuration is described. FIG. 4 is a flowchart illustrating one example of a processing operation of the control device according to the second example embodiment.

In the control device 50, the determination unit 51 determines, by use of a communication history, a channel and a data rate which are used for transmission in each of the communication devices 40, a transmission period, and a transmission schedule timing (step S101).

The determination unit 51 determines, among the communication devices 40-1 to 40-N, the plurality of collision-occurrence-estimated devices 40 which have the same previously allocated channel and data rate, and for which transmission collision is estimated to occur due to overlapping of transmission timings (step S102).

Figure 5:
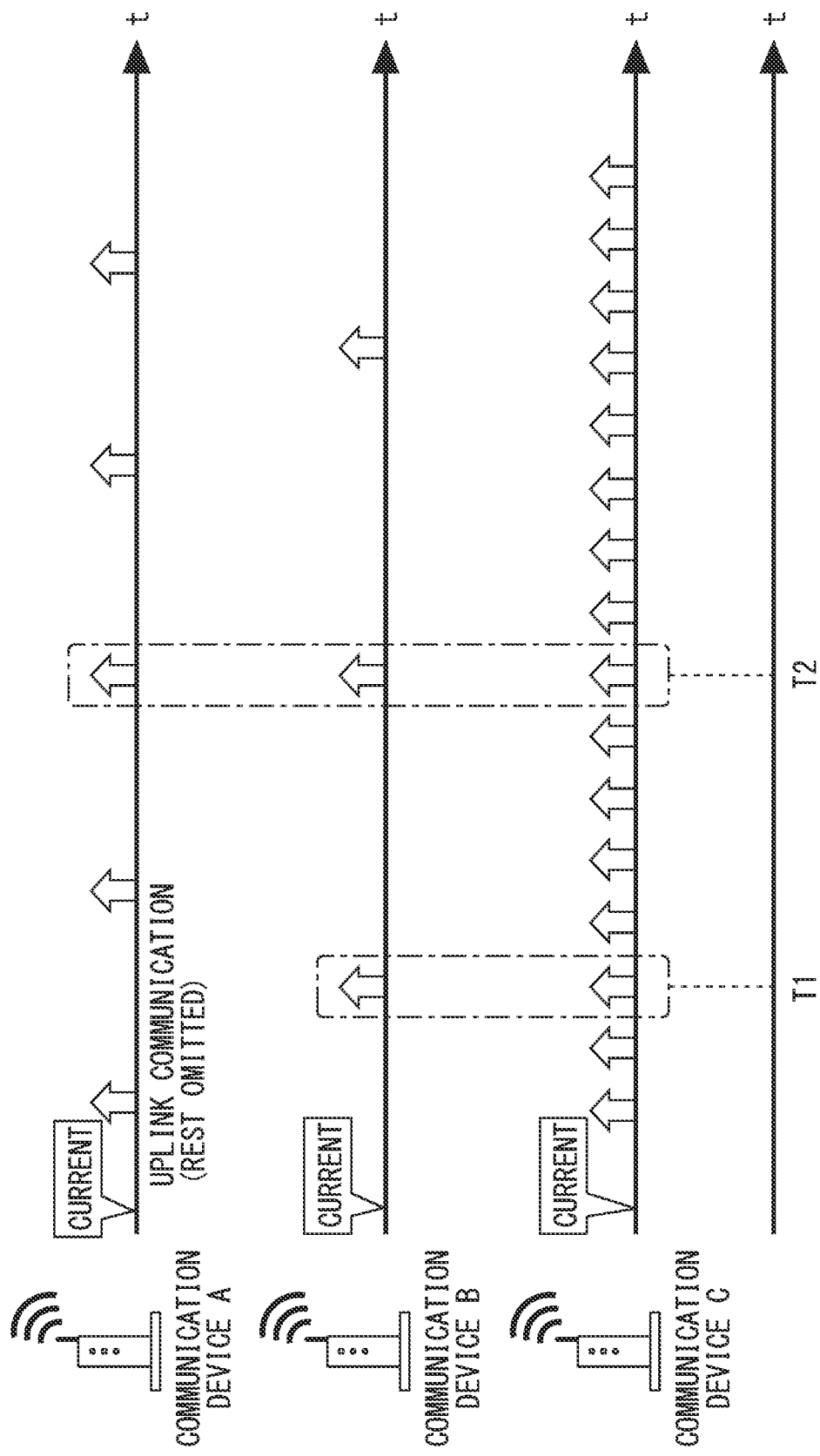
FIG. 5 is a diagram serving for description of a collision-occurrence-estimated device.

FIG. 5 is a diagram serving for description of a collision-occurrence-estimated device. FIG. 5 illustrates, with an arrow, each of transmission timings of the three communication devices 40 (described as communication devices A, B, and C in FIG. 5) whose transmission periods differ from one another. In FIG. 5, transmission timings of the communication devices B and C overlap at a timing T1, and transmission timings of the communication devices A, B, and C overlap at a timing T2. In this case, the determination unit 51 determines the communication devices A and B or the communication devices A, B, and C as the plurality of collision-occurrence-estimated devices 40.

Returning to the description in FIG. 4, the transmission control unit 52 allocates, from a plurality of data rates whose diffusion rates differ from one another, a use data rate to each of a plurality of "timing distribution control signals" for distributing transmission timings of a plurality of collision-occurrence-estimated devices, in such a way that use data rates being associated with the plurality of timing distribution control signals are distributed (step S103).

The transmission control unit 52 transmits, to the relay device 30, each of the timing distribution control signals including identification information of the communication device 40 being associated with each of the timing distribution control signals, and information indicating a use data rate allocated to each of the timing distribution control signals (step S104).

The relay device 30 receiving the timing distribution control signal transmits, toward the communication device 40 being associated with each of the timing distribution control signals, each timing distribution control signal by a use data rate being associated with each of the timing distribution control signals.

Figure 6:
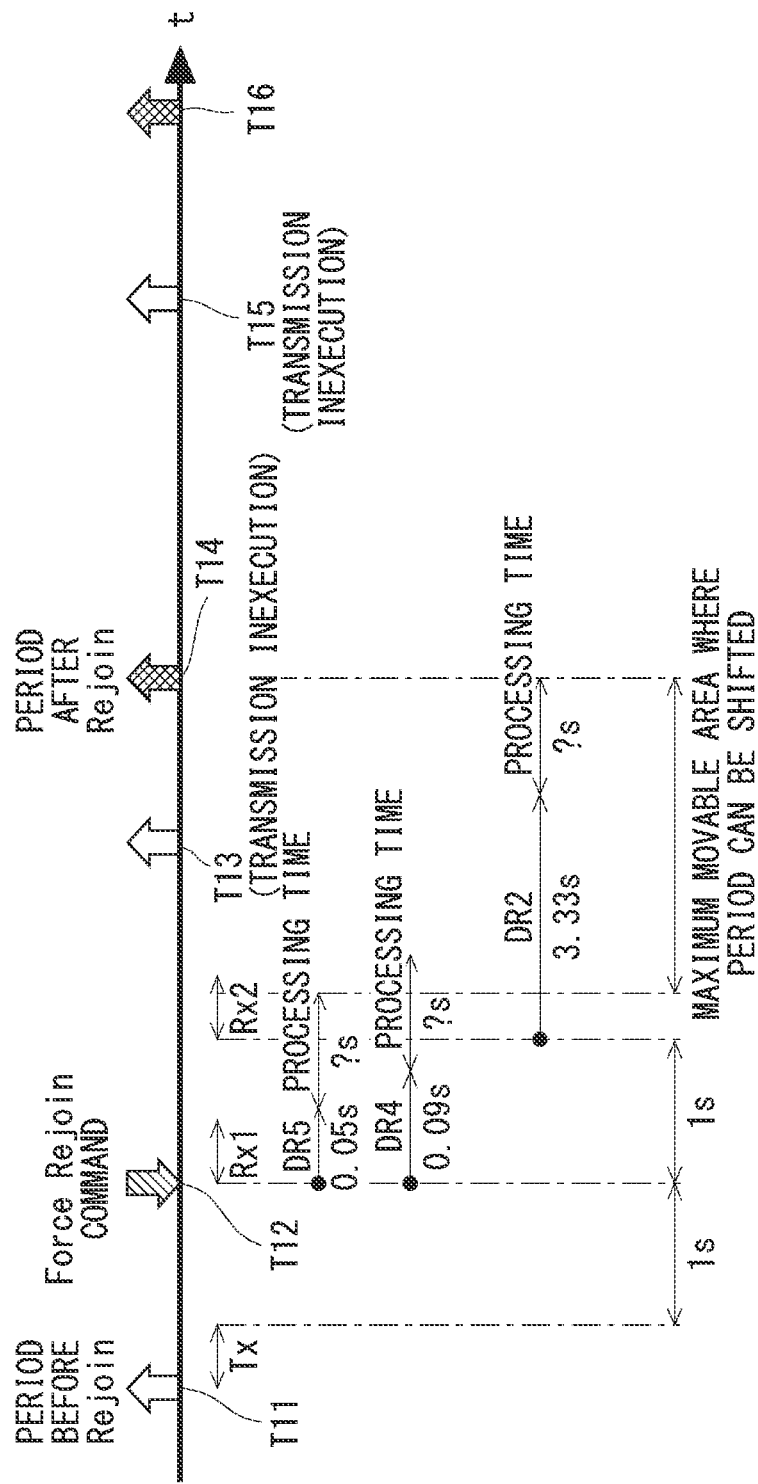
FIG. 6 is a diagram serving for description of transmission timing adjustment.

FIG. 6 is a diagram serving for description of transmission timing adjustment. In FIG. 6, an upward arrow represents transmission from a communication device toward a network device, and a downward arrow represents transmission from a network device toward a communication device. In FIG. 6, at a timing T11 in a period before transmission timing adjustment, a certain communication device 40 transmits a data signal toward the network device 20. Then, at a timing T12, the communication device 40 receives a force rejoin command as a timing distribution control signal. For example, when a force rejoin command is transmitted from the relay device 30 by a DR5 defined in LoRaWAN (registered trademark), it takes 0.05 seconds for the communication device 40 to receive the force rejoin command. Moreover, it takes 0.09 seconds to receive the force rejoin command in a case of a DR4, and it takes 3.33 seconds in a case of a DR2. In this way, a timing of completing reception processing in the communication device 40 differs in response to a change of a data rate used for transmission of a force rejoin command. Further, a timing of completing reception processing in the communication device 40 also differs in response to whether the communication device 40 receives a force rejoin command in the reception window RX1 or RX2, as described above. In the example illustrated in FIG. 6, a transmission timing of the communication device 40 is adjusted by a force rejoin command transmitted at a timing of the reception window RX2 by the DR2, thereby no transmission is performed at timings T13 and T15, and transmission is performed at timings T14 and T16.

Figure 7:
FIG. 7 is a diagram serving for description of another transmission timing adjustment.
Figure 8:
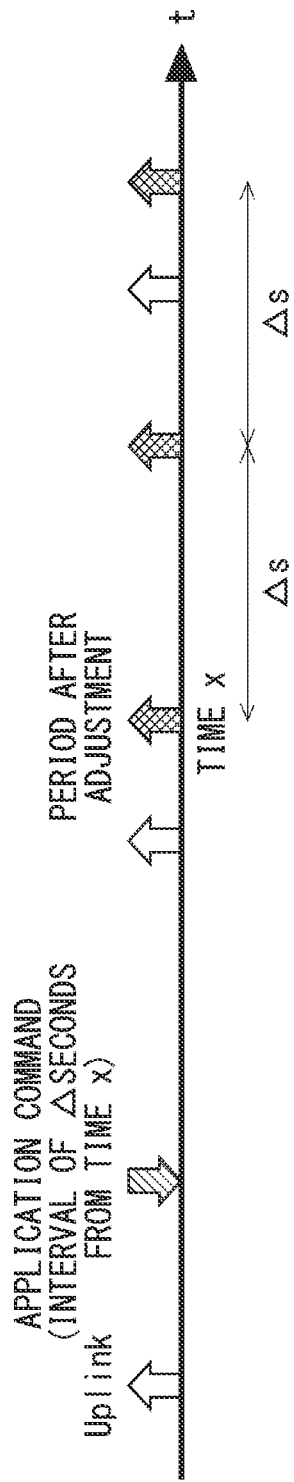
FIG. 8 is a diagram serving for description of another transmission timing adjustment.

FIGS. 7 and 8 are diagrams serving for description of other transmission timing adjustment. In FIGS. 7 and 8, an application command is used as a timing distribution control signal. Then, FIG. 7 illustrates a case where an application command is transmitted without establishing clock synchronization, and FIG. 8 illustrates a case where an application command is transmitted after establishing clock synchronization. In FIG. 7, the communication device 40 starts an after-adjustment transmission period after a predetermined time (10 seconds in FIG. 7) after reception of an application command. On the other hand, in FIG. 8, a transmission period is adjusted by a start time and a periodic interval (in FIG. 8, an interval of Δ seconds from a time X) designated by an application command.

Other Example Embodiments

Figure 9:
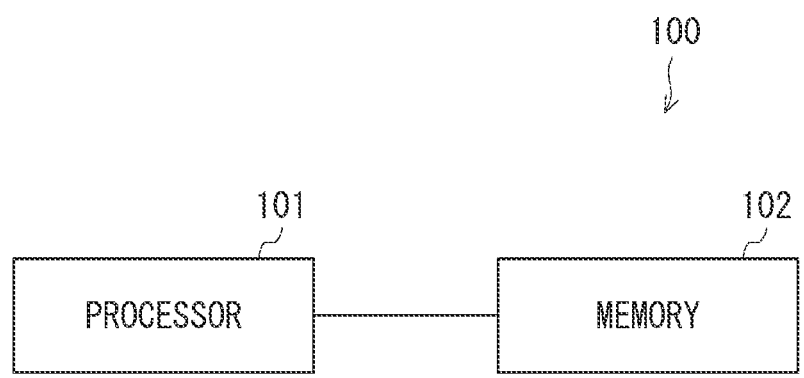
FIG. 9 is a diagram illustrating a hardware configuration example of a control device.

FIG. 9 is a diagram illustrating a hardware configuration example of a control device. In FIG. 9, a control device 100 includes a processor 101 and a memory 102. The processor 101 may be, for example, a microprocessor, a micro processing unit (MPU), or a central processing unit (CPU). The processor 101 may include a plurality of processors. The memory 102 is configured by a combination of a volatile memory and a non-volatile memory. The memory 102 may include a storage located apart from the processor 101. In this case, the processor 101 may access the memory 102 via a non-illustrated I/O interface.

The control devices 10 and 50 according to the first and second example embodiments can each have the hardware configuration illustrated in FIG. 9. The determination units 11 and 51 and the transmission control units 12 and 52 of the control devices 10 and 50 according to the first and second example embodiments may be implemented by the processor 101 reading and executing a program stored in the memory 102. The program can be stored by use of various types of non-transitory computer-readable media, and supplied to the control devices 10 and 50. Examples of the non-transitory computer-readable media include a magnetic recording medium (e.g., a flexible disk, a magnetic tape, and a hard disk drive), and a magneto-optical recording medium (e.g., a magneto-optical disk). Further, examples of the non-transitory computer-readable media include a CD-read only memory (CD-ROM), a CD-R, and a CD-R/W. Further, an example of the non-transitory computer-readable medium includes a semiconductor memory. The semiconductor memory includes, for example, a mask ROM, a programmable ROM (PROM), an erasable PROM (EPROM), a flash ROM, and a random access memory (RAM). Moreover, a program may be supplied to the control devices 10 and 50 by various types of transitory computer-readable media. Examples of the transitory computer-readable media include an electric signal, an optical signal, and an electromagnetic wave. The transitory computer-readable medium can supply a program to the control devices 10 and 50 via a wired communication path such as an electric wire and an optical fiber, or a wireless communication path.

While the invention of the present application has been described above with reference to the example embodiments, the invention of the present application is not limited by the above. Various changes which may be understood by a person skilled in the art can be made to a configuration and details according to the invention of the present application within the scope of the invention.

Some or all of the above-described example embodiments can also be described as, but not limited to, the following supplementary notes.

(Supplementary Note 1)

A control device which controls transmission timings of a plurality of communication devices existing under a network device and each transmitting a data signal toward the network device at a transmission period being associated with each of the communication devices, the control device including:
- a determination unit that determines a plurality of collision-occurrence-estimated devices for which transmission collision is estimated to occur due to overlapping of transmission schedule timings among the plurality of communication devices; and
- a transmission control unit that executes transmission control of transmitting, to each of some of the plurality of collision-occurrence-estimated devices, each of a plurality of timing distribution control signals for distributing transmission timings of the plurality of collision-occurrence-estimated devices.

(Supplementary Note 2)

The control device according to Supplementary note 1, wherein the transmission control unit executes the transmission control of allocating, from a plurality of data rates whose diffusion rates differ from one another, a use data rate to each of some or all of the plurality of timing distribution control signals, in such a way that use data rates being associated with the plurality of timing distribution control signals are distributed, and transmitting each timing distribution control signal by use of a use data rate allocated to each timing distribution control signal.

(Supplementary Note 3)

The control device according to Supplementary note 1 or 2, wherein
- the plurality of collision-occurrence-estimated devices include a collision-occurrence-estimated device being associated with same transmission period as those of other collision-occurrence-estimated devices among the plurality of collision-occurrence-estimated devices, and a collision-occurrence-estimated device whose transmission period differs from that of any of other collision-occurrence-estimated devices among the plurality of collision-occurrence-estimated devices, and
- the transmission control unit executes the transmission control of transmitting the timing distribution control signal, with, as a trigger, reception of a signal transmitted from the collision-occurrence-estimated device, before an occurrence timing at which the transmission collision is estimated to occur.

(Supplementary Note 4)

The control device according to any one of Supplementary notes 1 to 3, wherein the timing distribution control signal is a reconnection instruction signal requesting the collision-occurrence-estimated device receiving the timing distribution control signal to reconnect to the network device, or a transmission timing specification signal which specifies, for the collision-occurrence-estimated device receiving the timing distribution control signal, a transmission timing of a data signal scheduled to be transmitted next, to a timing after a predetermined time from a timing of receiving the timing distribution control signal.

(Supplementary Note 5)

The control device according to Supplementary note 4, wherein
- the network device and the plurality of communication devices are included in a LoRaWAN communication system, and
- the reconnection instruction signal is a force rejoin command.

(Supplementary Note 6)

The control device according to Supplementary note 4, wherein
- the network device and the plurality of communication devices are included in a LoRaWAN communication system, and
- the transmission timing specification signal is an application command.

(Supplementary Note 7)

The control device according to Supplementary note 4, wherein the transmission control unit executes the transmission control of transmitting the timing distribution control signal after transmitting a clock synchronization signal and then establishing clock synchronization between the network device and the collision-occurrence-estimated device.

(Supplementary Note 8)

The control device according to any one of Supplementary notes 1 to 7, wherein the plurality of collision-occurrence-estimated devices are a plurality of communication devices having the same allocated channel and data rate.

(Supplementary Note 9)

A network device including
- the control device according to any one of Supplementary notes 1 to 7.

(Supplementary Note 10)

A control method of controlling transmission timings of a plurality of communication devices existing under a network device and each transmitting a data signal toward the network device at a transmission period being associated with each of the communication devices, the control method including:

determining a plurality of collision-occurrence-estimated devices for which transmission collision is estimated to occur due to overlapping of transmission schedule timings among the plurality of communication devices; and executing transmission control of transmitting, to each of some of the plurality of collision-occurrence-estimated devices, each of a plurality of timing distribution control signals for distributing transmission timings of the plurality of collision-occurrence-estimated devices.

(Supplementary Note 11)

A control program causing a control device which controls transmission timings of a plurality of communication devices existing under a network device and each transmitting a data signal toward the network device at a transmission period being associated with each of the communication devices, to execute processing of determining a plurality of collision-occurrence-estimated devices for which transmission collision is estimated to occur due to overlapping of transmission schedule timings among the plurality of communication devices, and executing transmission control of transmitting, to each of some of the plurality of collision-occurrence-estimated devices, each of a plurality of timing distribution control signals for distributing transmission timings of the plurality of collision-occurrence-estimated devices.

(Supplementary Note 12)

A communication system including:

a plurality of communication devices existing under a network device and each transmitting a data signal toward the network device at a transmission period being associated with each of the communication devices; and the network device which controls transmission timings of the plurality of communication devices, wherein the network device includes a determination unit that determines a plurality of collision-occurrence-estimated devices for which transmission collision is estimated to occur due to overlapping of transmission schedule timings among the plurality of communication devices, and a transmission control unit that executes transmission control of transmitting, to each of some of the plurality of collision-occurrence-estimated devices, each of a plurality of timing distribution control signals for distributing transmission timings of the plurality of collision-occurrence-estimated devices.

This application is based upon and claims the benefit of priority from Japanese Patent Application No. 2019-037338, filed on Mar. 1, 2019, the disclosure of which is incorporated herein in its entirety by reference.

REFERENCE SIGNS LIST

1 Communication system
10 Control device
11 Determination unit
12 Transmission control unit
20 Network device
21 Communication unit
22 Storage unit
30 Relay device
40 Communication device
50 Control device
51 Determination unit
52 Transmission control unit

What is claimed is:

1. A control device which controls transmission timings of a plurality of communication devices existing under a network device and each transmitting a data signal toward the network device at a transmission period being associated with each of the communication devices, the control device comprising:

hardware including at least one processor and at least one memory;

determination unit implemented at least by the hardware and that determines a plurality of collision-occurrence-estimated devices for which transmission collision is estimated to occur due to overlapping of transmission schedule timings among the plurality of communication devices; and transmission control unit implemented at least by the hardware and that executes transmission control of transmitting, to each of some of the plurality of collision-occurrence-estimated devices, each of a plurality of timing distribution control signals for distributing transmission timings of the plurality of collision-occurrence-estimated devices, wherein the transmission control unit executes the transmission control of allocating, from a plurality of data rates whose diffusion rates differ from one another, a use data rate to each of some or all of the plurality of timing distribution control signals, in such a way that use data rates being associated with the plurality of timing distribution control signals are distributed, and transmitting each timing distribution control signal by use of a use data rate allocated to each timing distribution control signal.

2. The control device according to claim 1, wherein the plurality of collision-occurrence-estimated devices include a collision-occurrence-estimated device being associated with same transmission period as those of other collision-occurrence-estimated devices among the plurality of collision-occurrence-estimated devices, and a collision-occurrence-estimated device whose transmission period differs from that of any of other collision-occurrence-estimated devices among the plurality of collision-occurrence-estimated devices, and the transmission control unit executes the transmission control of transmitting the timing distribution control signal, with, as a trigger, reception of a signal transmitted from the collision-occurrence-estimated device, before an occurrence timing at which the transmission collision is estimated to occur.

3. The control device according to claim 1, wherein the timing distribution control signal is a reconnection instruction signal requesting the collision-occurrence-estimated device receiving the timing distribution control signal to reconnect to the network device, or a transmission timing specification signal which specifies, for the collision-occurrence-estimated device receiving the timing distribution control signal, a transmission timing of a data signal scheduled to be transmitted next, to a timing after a predetermined time from a timing of receiving the timing distribution control signal.

4. The control device according to claim 3, wherein the network device and the plurality of communication devices are included in a LoRaWAN communication system, and the reconnection instruction signal is a force rejoin command.

5. The control device according to claim 4, wherein
the network device and the plurality of communication devices are included in a LoRaWAN communication system, and
the transmission timing specification signal is an application command.

6. The control device according to claim 3, wherein the transmission control unit executes the transmission control of transmitting the timing distribution control signal after transmitting a clock synchronization signal and then establishing clock synchronization between the network device and the collision-occurrence-estimated device.

7. The control device according to claim 1, wherein the plurality of collision-occurrence-estimated devices are a plurality of communication devices having same allocated channel and data rate.

8. A network device comprising
the control device according to claim 1.

9. A control method of controlling transmission timings of a plurality of communication devices existing under a network device and each transmitting a data signal toward the network device at a transmission period being associated with each of the communication devices, the control method comprising:
determining a plurality of collision-occurrence-estimated devices for which transmission collision is estimated to occur due to overlapping of transmission schedule timings among the plurality of communication devices;
executing transmission control of transmitting, to each of some of the plurality of collision-occurrence-estimated devices, each of a plurality of timing distribution control signals for distributing transmission timings of the plurality of collision-occurrence-estimated devices; and
executing transmission control of allocating, from a plurality of data rates whose diffusion rates differ from one another, a use data rate to each of some or all of the plurality of timing distribution control signals, in such a way that use data rates being associated with the plurality of timing distribution control signals are distributed, and transmitting each timing distribution control signal by use of a use data rate allocated to each timing distribution control signal.

10. A non-transitory computer-readable medium storing a control program causing a control device which controls transmission timings of a plurality of communication devices existing under a network device and each transmitting a data signal toward the network device at a transmission period being associated with each of the communication devices, to execute processing of:
determining a plurality of collision-occurrence-estimated devices for which transmission collision is estimated to occur due to overlapping of transmission schedule timings among the plurality of communication devices,
executing transmission control of transmitting, to each of some of the plurality of collision-occurrence-estimated devices, each of a plurality of timing distribution control signals for distributing transmission timings of the plurality of collision-occurrence-estimated devices; and
executing transmission control of allocating, from a plurality of data rates whose diffusion rates differ from one another, a use data rate to each of some or all of the plurality of timing distribution control signals, in such a way that use data rates being associated with the plurality of timing distribution control signals are distributed, and transmitting each timing distribution control signal by use of a use data rate allocated to each timing distribution control signal.

* * * * *